United States Patent Office 3,559,253
Patented Feb. 2, 1971

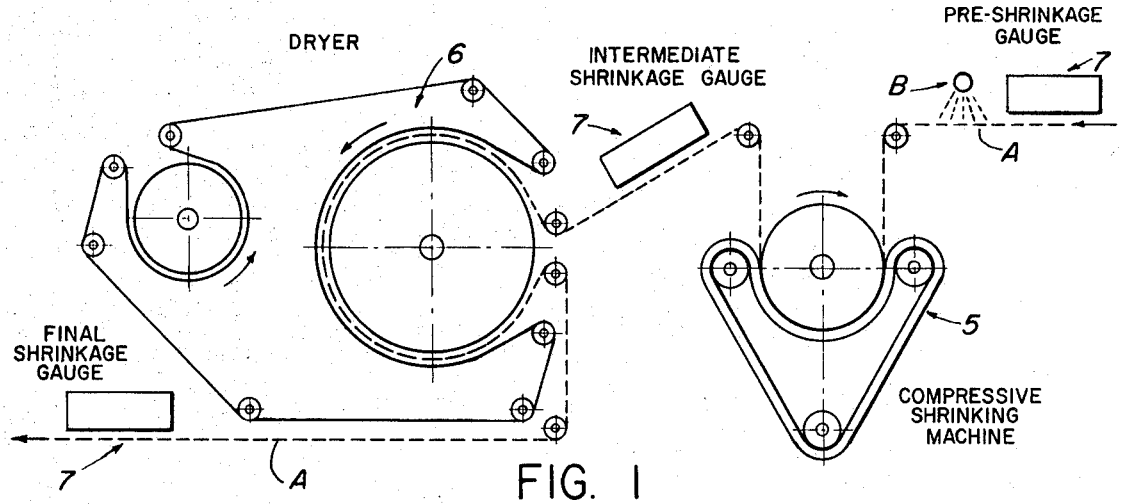
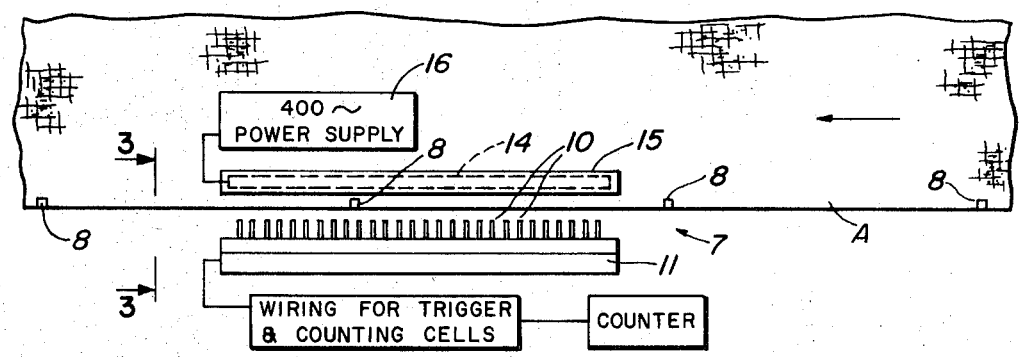
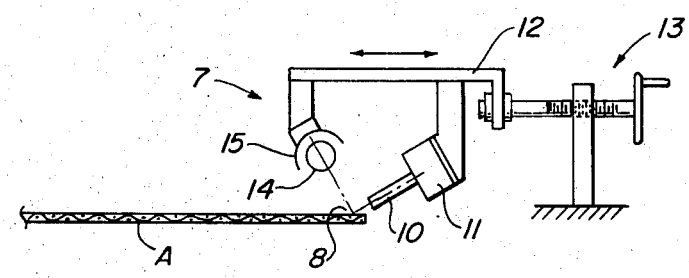
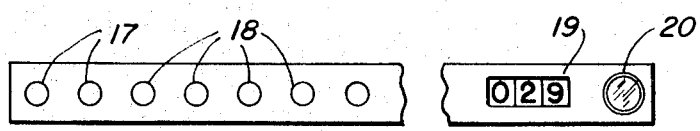

3,559,253
TEXTILE WEB SHRINKING APPARATUS COMPRISING MEANS FOR MEASURING DISTANCE BETWEEN INDEX MARKS ON THE WEB
Nestor W. Pandell, Waccabuc, and Robert M. Dowling, New Rochelle, N.Y., assignors to Cluett, Peabody & Co., Inc., Troy, N.Y.
Filed Nov. 5, 1968, Ser. No. 773,576
Int. Cl. D06c 21/00; G01t 1/16; H01j 39/12
U.S. Cl. 26—18.6                                8 Claims

ABSTRACT OF THE DISCLOSURE

This invention is directed to apparatus for the compressive shrinking of textile fabrics and having a gauge for measuring the distance between equally spaced longitudinally aligned photo-sensible index marks on a continuously advancing web of material and includes a trigger photocell for detecting the passage of a first index mark and for activating a plurality of counting photocells to measure the continuing passage of the first index mark until a second index mark reaches the trigger photocell and causes it to cause discontinuance of the passage measurement of the first index mark. Visual means are provided to indicate the length of passage of the first index mark along the counting photocells until passage measurement is discontinued.

---

This invention relates generally to new and useful improvements in linear measuring instruments and particularly seeks to provide a novel gauge for measuring the shrinkage of a continuously moving woven textile web as it passes through a compressive shrinking apparatus.

The compressive shrinking of woven textile fabrics has become highly developed both as to methods and apparatus for effecting same. However, and regardless of the exact method or apparatus to be used, it is first necessary to wash test the fabric to be compressively shrunk in order to determine its potential residual shrinkage when laundered and then operate the apparatus in such a manner as to reduce the residual shrinkage to zero. This obviously requires means for accurately measuring the amount of compressive shrinkage being imparted to the fabric in order to maintain proper control over the operation.

One reasonably satisfactory approach to solving this problem is disclosed in U.S. Pat. No. 2,885,763 in which two tachometer generators, mechanically driven from two separate sections of the machine, are electrically connected to a visual indicator to provide a continuous showing of the changes in shrinkage of the fabric between the two tachometer generator drive stations. Errors in apparent shrinkage values can creep into this type of measuring system because the tachometer generators are mechanically driven from rotating elements of the apparatus over which the fabric web is threaded and thus cannot detect any relative slippage that may occur.

Manual before and after measurements to determine the amount of compressive shrinkage are totally unsatisfactory because the final measurements can only be made after the fabric web has been discharged from the apparatus and is at rest, thus creating a time lag during which any need for adjustment to the operating conditions of the apparatus could not be detected and imperfectly shrunk portions of fabric might result. Naturally it is damaging to have imperfectly shrunk fabrics reach consumers. Also these manual measurements frequently necessitated multiple runs of a fabric through the machine which aggravated production costs. However, a shrinkage gauge constructed in accordance with this invention overcomes such problems.

An object of this invention is to provide novel apparatus for the compressive shrinking of a continuously advancing textile web having a multiplicity of equally spaced longitudinally aligned photo-sensible index marks which includes a compressive longitudinal shrinking device and at least one gauge for continuously scanning the index-marked portion of the advancing web and measuring the distance between successive pairs of index marks.

Another object of this invention is to provide a shrinkage gauge that includes a single bank or matrix of photoelectric cells aligned in close juxtaposition over the path of travel of the index-marked edge of the fabric edge whereby to provide an automatic frequency count of the passage of the index markings, thus indicating an increase or decrease in the effective compressive shrinkage, imposed on the fabric.

Another object of this invention is to provide a shrinkage gauge of the character stated that operates cyclically and in which the bank of photo-electric cells includes a trigger cell that initiates and stops each cycle of index-marking frequency measurement.

Another object of this invention is to provide a shrinkage gauge of the character stated in which the bank of photo-electric cells is disposed at an angle with respect to the plane of the moving fabric web and a light source, having a length at least equal to the length of the cell bank, supplies reflected light to the cells from the surface of the fabric web.

Another object of this invention is to provide a shrinkage measuring system for a compressive shrinking apparatus in which a shrinkage gauge scans the fabric web before it enters the apparatus in order to detect any false or apparent shrinkage changes due solely to changes in tension in the entering fabric web and in which another shrinkage gauge scans the fabric web at a location following completion of the compressive shrinking operation.

A further object of this invention is to provide a shrinkage gauge of the character stated that is simple in design, rugged in construction and economical to manufacture.

DRAWINGS

With these and other objects, the nature of which will appear, the invention will be more fully understood by reference to the drawings, the accompanying detailed description and the appended claims.

In the drawings:

FIG. 1 is a schematic side elevation of one form of compressive shrinking apparatus in connection with shrinkage gauges constructed in accordance with this invention may be used;

FIG. 2 is a partly schematic top plan view of the shrinkage gauge as installed, but eliminating any details of the mountings therefor in the interest of clarity;

FIG. 3 is a transverse section taken along line 3—3 of FIG. 2 and schematically indicates the mounting and lateral adjusting means for the shrinkage gauge;

FIG. 4 is a schematic showing of the visual display indicator for the unit; and

PREFERRED EMBODIMENT

Figure 5:
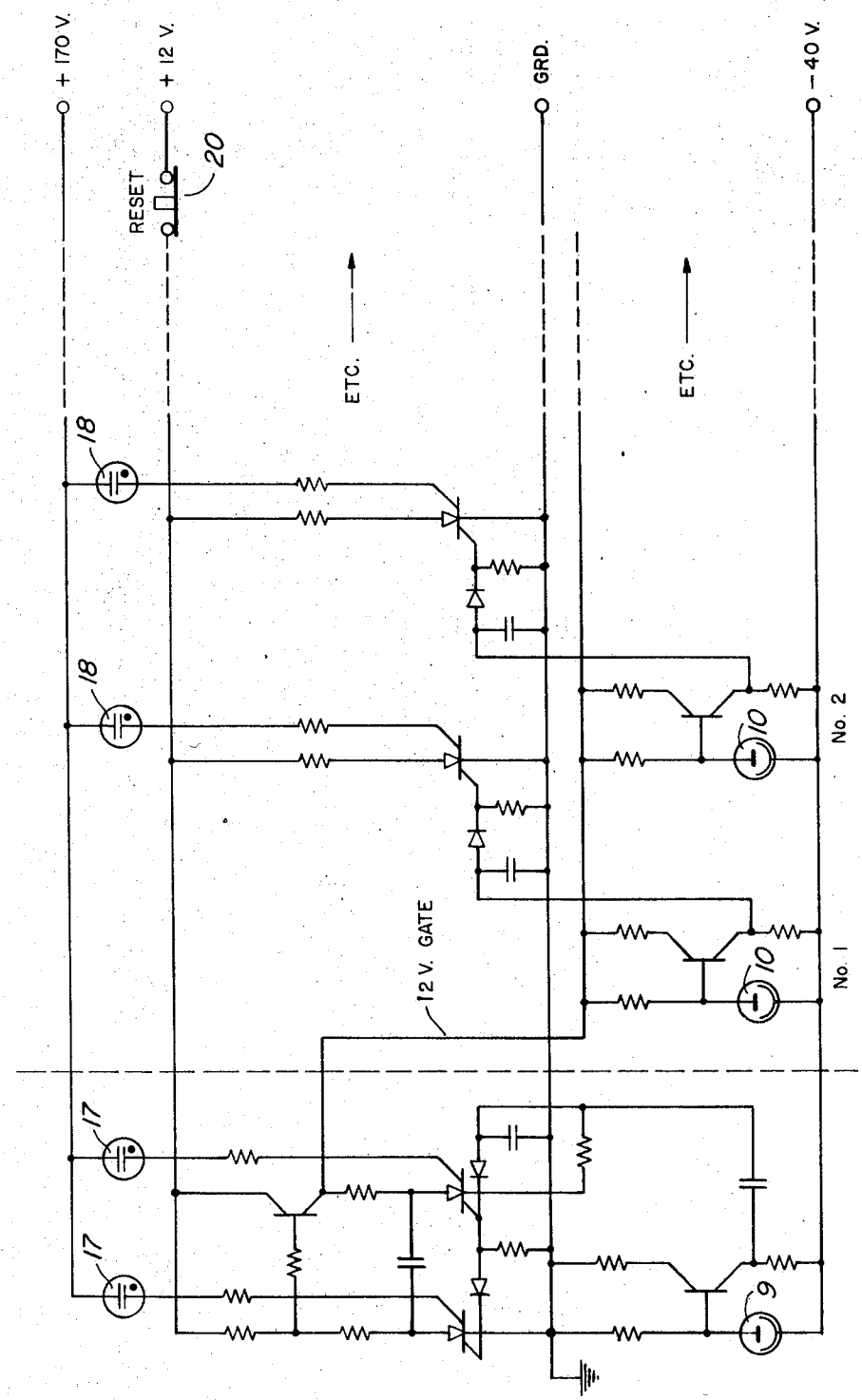
FIG. 5 is a representative wiring diagram for the trigger and counting sections of the gauge.

Referring to the drawings in detail it will be seen from FIG. 1 thereof that the illustrated embodiment of the invention is adapted to be installed in one or more locations in a continuously operating fabric processing unit that includes a felt or rubber belt compressive shrinking machine generally indicated 5 and a dryer unit generally indicated 6. The fabric web A, prior to entering the compressive shrinking machine, has been moistened or otherwise preconditioned by means schematically indicated at B and after leaving the dryer section it generally passes through a folder or plaiter as an incident to its discharge into a transport cart. The linear speed of operation of these processing units is generally on the order of 125 yards per minute, although this may vary from a low such as 15 yards per minute to a high considerably beyond 125 yards per minute. Regardless of the speed of operation, it is necessary for the proper control thereof to measure accurately the linear condition of the fabric web before it enters the compressive shrinking machine in order to establish a control for the operative adjustments of that unit as well as that of the dryer or any other subsequent processing units involved in the overall compressive shrinking operation so that the desired net amount of compressive shrinking can be properly effected. It is also necessary to effect similar linear measurements at subsequent stages, such as prior to and after drying or after calendering or tentering, as a guide for operational adjustments of the apparatus. To this end, shrinkage gauges generally indicated 7 may be installed at the locations necessary to provide these comparative linear measurements.

One edge of the fabric web A is provided with a continuous series of equally spaced, substantially invisible, index markings 8 that will fluoresce when subject to ultraviolet light and the movement of any two such markings past a shrinkage gauge 7 will cause the gauge to measure accurately the distance therebetween, and comparative readings between gauges will of course show any changes in shrinkage or elongation that has taken place. Measurements of this type are absolute and do not reflect or incorporate any errors that otherwise might appear if the measurements were to be taken from any moving parts of the equipment where relative slippage of the fabric could occur. The elimination of such possible errors means that the desired reduction of residual shrinkage to zero may be more readily attained.

Each shrinkage gauge 7 included a battery of aligned photocells comprising a trigger cell 9 and a multiplicity of counting cells 10, all mounted in a matrix 11 supported by a frame 12 that is laterally adjustable as by a handwheel assembly generally indicated at 13. The total length spanned by the counting and trigger cells is somewhat greater than the initial spacing between any two of the index marks 8 prior to any compressive shrinking of the fabric so that the same size of gauge may be used for pre-shrinkage as well as post-shrinkage measurements.

The counting and trigger cells preferably are disposed at about a 30° angle to the plane of the fabric and with their outer ends positioned about ¼" above the surface of the fabric. A tubular ultra violet light 14 is mounted in a fixture 15 depending from the frame 12 and is connected to a suitable 400 or other desired cycle power supply schematically indicated at 16.

The trigger cell 9 is connected to two neon lamps 17, 17 through a "flip-flop" amplifying circuit (see FIG. 5) and each of the counting cells 10 is connected to a similar neon lamp 18 through its own amplifying circuit in order to provide visual indication of the sensing action of the photocells as an index mark 8 passes therebeneath. The wiring diagram of FIG. 5 is merely considered to be typical for this purpose and no values have been indicated for the various resistors, capacitors, etc. as these values depend upon the characteristics of the types of photocells and lamps selected for any given installation. If desired, a counter 19 (see FIG. 4) may be included to show the total number of photocells that have been passed by an index mark during a given measuring operation.

In this system when the trigger cell 9 senses the passage of a first index mark 8, its circuit imposes a bias voltage on the counting cell circuits to enable the counting cells 10 to successively sense the passage of that index mark and light the corresponding neon lamps 18. When a second index mark 8 passes the trigger cell 9 the bias voltage is removed and the counting cells become deactivated insofar as sensing continued passage of the first index mark is concerned. A manual button 20 resets the entire system. The number of counting cells that have been passed by the first index mark before the second index mark activates the trigger cell provides an accurate measurement of the distance between the two index marks because the counting cells are closely and equally spaced a predetermined distance apart. For example, if, prior to shrinking, the index marks 8 are 36" apart, each gauge 7 could include a single trigger cell 9 and a 40" bank of counting cells on ⅛" or ¼" centers thus providing a measurement having an accuracy to ⅛" (or ¼") in 36". When the fabric has been compressively shrunk the index marks will be closer together and fewer counting cells will be passed by a first index mark before a second index mark activates the trigger cell to deactivate the remaining counting cells. A comparison of the two measurements gives the actual shrinkage which can be converted to percent shrinkage is desired. Conversely, if any elongation of the fabric should take place, the index marks will become spaced farther apart and more of the counting cells will be passed each time a measurement is taken, thus measuring the actual increased length.

It will be seen that gauges constructed in accordance with this invention are capable of sensing the passage of spaced index marks on a continuously moving fabric web and accurately measuring the distance between two successive marks as an incident to the relative shrinkage or elongation of the fabric at two or more locations during its passage through the processing unit.

It should also be noted that a simple photoelectric timer to measure the time interval between successive index markers, and thus indicate relative changes in length, would not be effective for the purposes of this invention because the linear speed of advance of the fabric web through the apparatus is not constant.

We claim:

1. In an apparatus for the compressive shrinking of a continuously advancing textile web provided with equally spaced longitudinally aligned photo-sensible index marks wherein is provided a compressive longitudinal shrinking device, the combination of first means located ahead of said compressive longitudinal shrinking device for measuring the distance between said index marks.

2. The apparatus of claim 1 additionally including second means located at at least one position following said compressive longitudinal shrinking device for measuring the distance between said index marks whereby to provide comparative distance measurements between those made by said first and second means.

3. The apparatus of claim 1 in which said measuring means includes a sensing system having a light source directed along the path of travel of said index marks, a trigger photocell positioned in proximity to the path of travel of said index marks and disposed to receive reflected light from said light source, a plurality of equally spaced longitudinally aligned counting photocells having their sensing ends disposed in proximity to the path of travel of said index marks, means for causing said trigger photocell to activate said counting photocells to sense and indicate passage of said first index mark, and means thereafter effective for causing said trigger photocell at the time a second index mark passes therebeneath to deactivate those counting photocells that lie beyond the then position of said first index mark.

4. The apparatus of claim 2 in which said measuring means includes a sensing system having a light source directed along the path of travel of said index marks, a trigger photocell positioned in proximity to the path of travel of said index marks and disposed to receive reflected light from said light source, a plurality of equally spaced longitudinally aligned counting photocells having their sensing ends disposed in proximity to the path of travel of said index marks, means for causing said trigger photocell to activate said counting photocells to sense and indicate passage of said first index mark, and means thereafter effective for causing said trigger photocell at the time a second index mark passes therebeneath to deactivate those counting photocells that lie beyond the then position of said first index mark.

5. The apparatus of claim 3 additionally including means for visually indicating which of said counting photocells have sensed the passage of said first index mark therebeneath.

6. The apparatus of claim 4 additionally including means for visually indicating which of said counting photocells have sensed the passage of said first index mark therebeneath.

7. The apparatus of claim 3 additionally including means for laterally adjusting said light source and said photocells with respect to the path of travel of said index marks.

8. The apparatus of claim 4 additionally including means for laterally adjusting said light source and said photocells with respect to the path of travel of said index marks.

References Cited

UNITED STATES PATENTS

| | | | |
|---|---|---|---|
| 1,998,950 | 4/1935 | Cockrell | 250—209X |
| 2,989,690 | 6/1961 | Cook | 250—219X |
| 3,066,226 | 11/1962 | Lindstrom | 250—209X |
| 3,475,611 | 10/1969 | Kitchener | 250—219 |

FOREIGN PATENTS

| | | | |
|---|---|---|---|
| 1,011,720 | 12/1965 | Great Britain | 250—219 |

ARCHIE R. BORCHELT, Primary Examiner

T. N. GRIGSBY, Assistant Examiner

U.S. Cl. X.R.

250—83.3, 209, 219